April 27, 1954
W. D. GOVE
2,676,461
HEAD COMPENSATING VALVE FOR FUEL NOZZLES
Filed April 19, 1952
FIG.1
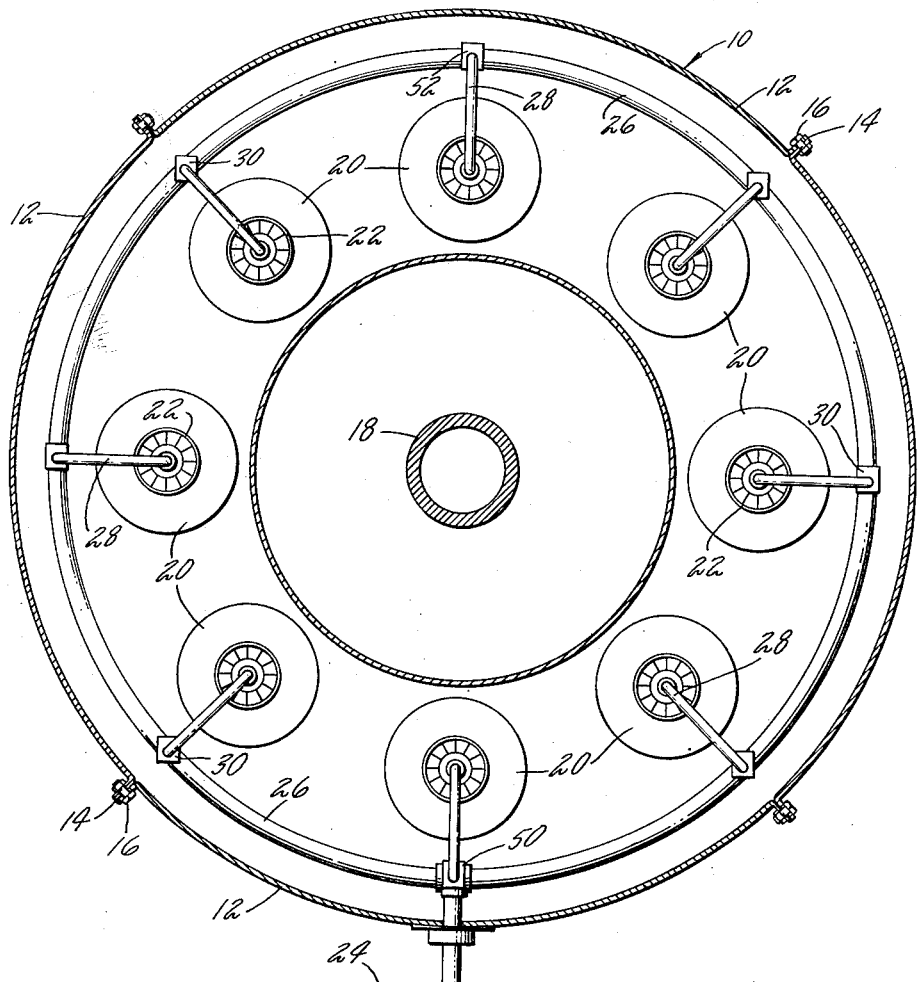
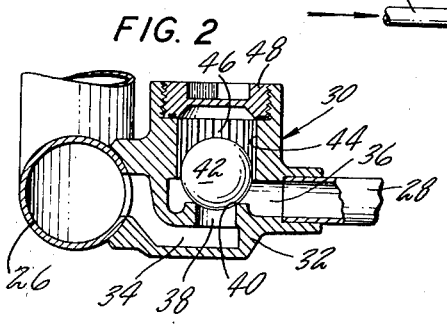
FIG. 2
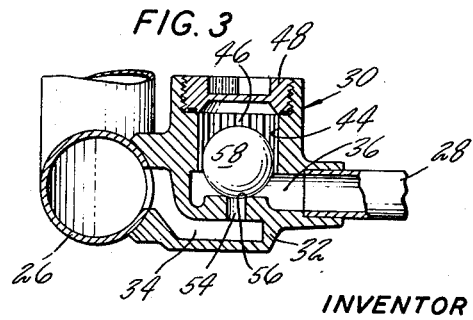
FIG. 3
INVENTOR
WINFIELD D. GOVE
BY *Russell M. Lipes, Jr.*
AGENT Patented Apr. 27, 1954

2,676,461

UNITED STATES PATENT OFFICE 2,676,461

HEAD COMPENSATING VALVE FOR FUEL NOZZLES

Winfield D. Gove, Manchester, Conn., assignor to United Aircraft Corporation, East Hartford, Conn., a corporation of Delaware Application April 19, 1952, Serial No. 283,225

4 Claims. (Cl. 60—39.74)

This invention relates to fuel systems for gas turbine power plants, more particularly to head compensating valves for fuel nozzles.

Gas turbine power plants customarily employ a plurality of fuel nozzles for supplying fuel to the combustion section of the power plant, the nozzles being mounted in a ring around the power plant axis. Normally the plane of this ring is substantially vertical and differences in pressure head due to differences in elevation of the nozzles has not been of particular concern. However, with the building of larger and more powerful power plants, dimensioning has increased to the point where, in the large diameter ring manifolds presently being used for distributing fuel to the combustion section, pressure head is a problem and there is a requirement in the fuel system for head compensation, particularly in the secondary supply of a duplex system. Head compensation also has become a problem with low fuel flows and the fact that there is a tendency toward lower fuel pressures adds to the problem and makes the requirement for head compensation even more important.

A feature of this invention is a fuel system which compensates for differences in pressure head at fuel nozzles in the system.

Another feature of the invention is a fuel system for gas turbine power plants in which fuel flow to nozzles in the combustion section is equalized by the use of compensating valves at each nozzle.

Still another feature of the invention is the use of valves of varying flow resistance to compensate for differences in pressure head in an apparatus subject to varying acceleration forces.

The novel features which are characteristic of this invention are set forth more in detail in the claims appended thereto, but the nature and scope of the invention may be better understood by referring to the following description, taken in connection with the accompanying drawing forming a part thereof, in which a specific embodiment of the invention has been set forth for purposes of illustration.

In the single drawing:

Fig. 1 is a vertical section through a gas turbine power plant immediately upstream of the combustion section.

Fig. 2 is an enlarged sectional view of one of the head compensating valves.

Fig. 3 is a sectional view through a modification of the head compensating valve.

Referring now to the drawing, there is shown in Fig. 1 the outer casing 10 of a gas turbine power plant. The casing is made up of quarter sections 12 secured together at flanges 14 by bolts 16 to form a cylinder. This construction provides for removal of any section separately and renders the interior of the power plant readily accessible for making repairs, changes, etc. Shaft 18 extends longitudinally through the casing and a plurality of combustion cans 20 are mounted within casing 10 and in a circle concentric with the shaft, the axis of the cans being substantially parallel to the axis of the shaft. A fuel nozzle 22 is mounted at the upstream, or near, end of each can 20. Fuel under pressure, from a source not shown, is fed to these nozzles through conduit 24, ring manifold 26, and lines 28 between the nozzles and the manifold. The plane of the ring manifold is substantially vertical for normal positions of operation of the power plant and, therefore, there is a difference in vertical height of the various fuel nozzles. To compensate for this difference, a valve 30 is mounted between manifold 26 and each of lines 28.

The details of head compensating valve 30 are shown in Fig. 2. The valve comprises a body 32 having therein passage 34 connected with manifold 26 and passage 36 connected with line 28, passages 34 and 36 being interconnected by passage 38. The upper end of passage 38 forms a seat 40 for ball 42, the diameter of the ball being substantially larger than the diameter of the passage so that the ball forms a closure for the passage when positioned on the seat. Grooved wall 44 of cylindrical chamber 46 closely surrounds the ball and, since the longitudinal axis of the chamber is parallel to and concentric with the longitudinal axis of passage 38, confines movement of ball 40 to a direction parallel to the longitudinal axis of passage 38. The wall is grooved to prevent the entrapment of fuel behind the ball which would impair proper functioning of the valve. Cap 48 closes the upper end of chamber 44 and provides access thereto.

By varying the weight of each of the balls 42 as a function of the location of its associated nozzle in the fuel system, differences in nozzle fuel pressure due to differences in elevation can be equalized. By way of illustration, compensating valve 50 and its associated nozzle occupy the lowest position in the system and, consequently, this nozzle is subject to the greatest pressure head in the system. Therefore, the weight of the ball in compensating valve 50 must be greater than the weight of the balls in any of the other valves. The pressure head at compensating valve 52 and its associated nozzle would be the lowest in the system and, therefore, the weight of the ball in this valve would be less than that of any of the other balls. The weight of the balls in the other compensating valves would be intermediate of the maximum and minimum weights, dependent upon the location of the particular valve and its associated nozzle in the fuel system.

Weighted ball 42 depends on gravity to position it on seat 40 and in order that gravity will have a maximum effect the direction of movement of the ball should be vertical. Therefore, each valve is positioned in the system so that the longitudinal axis of chamber 46 is substantially vertical for normal operation of the power plant. If not vertical, the axis of the chamber in each valve should be substantially parallel so that vertical accelerations will affect each ball equally. In such an arrangement both the weight of the ball and the pressure head are increased in the same proportion during any vertical acceleration.

Variations in weight of the balls can be accomplished for example by using hollow balls, by making the balls of different materials, or by drilling the balls and filling the drilled holes with a lightweight material such as solder.

Since it may be difficult or objectionable to attempt to vary the weight of balls 42, compensation for differences in pressure head can be accomplished by varying the area of the ball seat. Such a modification is shown in Fig. 3 in which the diameter of passage 54 and seat 56 is less than that of passage 38 and seat 40 shown in Fig. 2. In this arrangement the weight of balls 58 is the same in each of the compensating valves but the diameter of the passage on which the ball seats is varied in accordance with the location of the valve in the fuel system. The valve having the smallest diameter seat would naturally be associated with the nozzle subject to the highest pressure head, and the area of the seat in other compensating valves in the system would be larger according to the location of the valve and its associated nozzle in the system.

Thus by varying the weight of the ball in each compensating valve or by varying the diameter of the passage closed by the ball, all fuel nozzles in the system can be made to open simultaneously, and fuel flow from each nozzle equalized.

It is to be understood that the invention is not limited to the specific embodiment herein illustrated and described, but may be used in other ways without departure from its spirit as defined by the following claims.

I claim:

1. A fuel system for a gas turbine power plant having a plurality of fuel nozzles at different vertical locations with respect to the power plant axis, and a valve associated with each nozzle for compensating for a difference in pressure head at the nozzles, each valve having a passage for the flow of fuel therethrough, a movable closure interposed in the passage and restricting fuel flow, and a seat for the closure defined by the passage walls, fuel flow through each valve being regulated by individually selecting the weight of each closure so as to equalize flow from the nozzles, said closure decreasing in weight as vertical height increases.

2. In a gas turbine power plant having a combustion section, a plurality of fuel nozzles mounted at different vertical locations within the combustion section, a source of fuel and at least one manifold connecting said fuel source and said nozzles; a pressure head compensating valve associated with each of said nozzles, each of said valves having a passage for the flow of fuel therethrough, a movable closure interposed in the passage and restricting fuel flow, a seat for the closure defined by the passage walls, the closure and seat being positioned so that gravity will have a maximum effect in seating the closure, the weight of each closure being individually selected and decreasing as vertical height increases so as to equalize fuel flow from the nozzles.

3. In a gas turbine power plant having a combustion section, a plurality of fuel nozzles mounted at different vertical locations within the combustion section, a source of fuel and at least one manifold connecting said fuel sources and said nozzles; a pressure head compensating valve located between said manifold and each of said nozzles, each of said valves having passages for the flow of fuel therethrough, a weighted ball interposed in the passages for restricting fuel flow through the valve, one of the passages having walls forming a seat for the ball, the ball being free to move away from the seat to increase fuel flow through the valve, the weight of the ball in each valve being a function of the vertical location of the valve with respect to the other valves and decreasing as vertical height increases so as to equalize fuel flow from the nozzles, each valve being positioned so that gravity will exert a maximum force in seating the ball during normal operation of the power plant.

4. In a gas turbine power plant having a combustion section, a plurality of fuel nozzles mounted at different vertical locations within the combustion section, a source of fuel and a manifold connecting said source and said nozzles; a pressure head compensating valve located between said manifold and each of said nozzles, each of said valves having an inlet and an outlet for the flow of fuel therethrough, an intermediate passage between said inlet and said outlet, the walls of the intermediate passage defining a seat, a movable ball adapted to be positioned on said seat and for restricting fuel flow through said intermediate passage and seat, the diameter of the ball being substantially larger than the diameter of the seat, a chamber surrounding said ball and defining the path of motion of the ball, the weight of the ball in each valve being a function of the vertical location of the valve with respect to the other valves and decreasing as vertical height increases so as to equalize fuel flow from the nozzles, each valve being positioned so that gravity will exert the maximum force in seating the ball during normal operation of the power plant.

References Cited in the file of this patent

UNITED STATES PATENTS

| Number | Name | Date |
|---|---|---|
| 2,404,334 | Whittle | July 16, 1946 |
| 2,430,264 | Wiegand et al. | Nov. 4, 1947 |
| 2,436,815 | Lum | Mar. 2, 1948 |
| 2,536,440 | Greenland | Jan. 2, 1951 |
| 2,566,734 | Lawrence et al. | Sept. 4, 1951 |
| 2,599,680 | Weeks | June 10, 1952 |
| 2,606,066 | Thompson | Aug. 5, 1952 |